(12) United States Patent
Gossner

(10) Patent No.: US 6,431,347 B1
(45) Date of Patent: Aug. 13, 2002

(54) CONVEYABLE-ARTICLE CARRIER

(75) Inventor: Anton Gossner, Augsburg (DE)

(73) Assignee: WF Logistik GmbH, Landsberg (DE)

( * ) Notice: Subject to any disclaimer, the term of this patent is extended or adjusted under 35 U.S.C. 154(b) by 0 days.

(21) Appl. No.: 09/646,393

(22) PCT Filed: Apr. 1, 1999

(86) PCT No.: PCT/EP99/02237

§ 371 (c)(1),
(2), (4) Date: Sep. 18, 2000

(87) PCT Pub. No.: WO99/52799

PCT Pub. Date: Oct. 21, 1999

(30) Foreign Application Priority Data

Apr. 15, 1998 (DE) .......................................... 198 16 688

(51) Int. Cl.⁷ ........................ B65G 17/32; B65G 29/00; B65G 37/00; B65G 43/08; B65G 47/84
(52) U.S. Cl. ............................... 198/687.1; 198/465.4; 104/172.4
(58) Field of Search .............................. 198/465.4, 685, 198/687, 867.14; 104/172.4

(56) References Cited

U.S. PATENT DOCUMENTS

| | | | | |
|---|---|---|---|---|
| 3,896,921 A | * | 7/1975 | Sund et al. | 198/687.1 X |
| 4,058,064 A | * | 11/1977 | Wilder et al. | 104/172.4 |
| 4,201,286 A | * | 5/1980 | Meier | 198/461 X |
| 5,819,906 A | * | 10/1998 | Enderlein et al. | 198/687.1 X |
| 6,109,422 A | * | 8/2000 | Gossner | 198/465.4 X |

FOREIGN PATENT DOCUMENTS

| | | |
|---|---|---|
| DE | 1 256 153 | 12/1967 |
| DE | 1 456 712 | 9/1969 |
| DE | 24 07 847 | 9/1975 |
| DE | 39 26 755 | 2/1991 |
| DE | 195 17 276 | 11/1996 |
| DE | 196 30 140 | 2/1997 |
| EP | 0 623 497 | 11/1994 |
| EP | 0 623 497 | 1/1997 |

* cited by examiner

*Primary Examiner*—Christopher P. Ellis
*Assistant Examiner*—Gene O. Crawford
(74) *Attorney, Agent, or Firm*—Arent Fox Kintner Plotkin & Kahn

(57) ABSTRACT

A conveyable-article carrier for transporting conveyable articles along a conveying section in a conveying apparatus has running rails for guiding conveyable-article carriers and also has a drive belt guided along the running rails, and carries along the conveyable-article carriers along the conveying section. Each conveyable-article carrier has a carrier body and a coupling element located on the carrier body and is brought into drive connection with the drive belt. The conveyable-article carriers can also be accumulated in at least one build-up region of the conveying apparatus, as the drive belt continues running, and each have a separating device which can be activated under the action of the build-up pressure and for temporarily releasing the drive connection. The coupling element is designed as a part of the separating device which can be moved relative to the carrier body between a drive position, for coupling to the drive belt, and a neutral position, for disengaging from the drive belt.

6 Claims, 4 Drawing Sheets

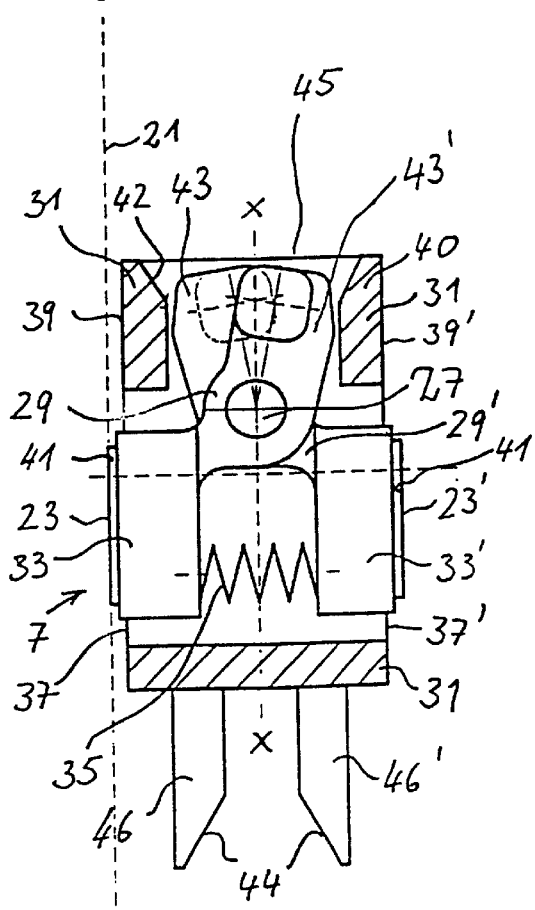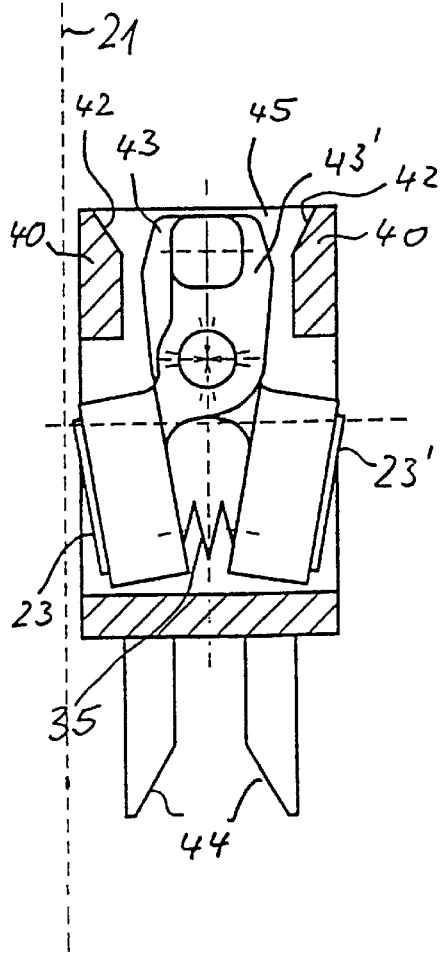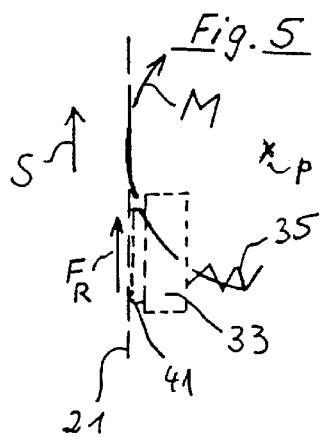

CONVEYABLE-ARTICLE CARRIER

DESCRIPTION

The invention relates to a conveyable-article carrier for transporting conveyable articles along a conveying section in a conveying apparatus, in particular a suspended conveying apparatus, which has running rails for guiding conveyable-article carriers and also has a drive belt which is guided along the running rails and is intended for carrying along the conveyable-article carriers along the conveying section, it being the case that each conveyable-article carrier has a carrier body and a coupling element which is located on the carrier body and is intended for being brought into drive connection with the drive belt, it being the case that the conveyable-article carriers can also be accumulated in at least one build-up region of the conveying apparatus, as the drive belt continues running, and each have a separating device which can be activated under the action of the build-up pressure and is intended for temporarily releasing the drive connection.

A conveyable-article carrier and a conveying apparatus of the abovementioned type are known, for example, from EP-0 623 497 B1. These known conveyable-article carriers are so-called hanger carriers for transporting items of clothing hanging on clothes hangers in a suspended conveying apparatus. During conveying operation, the hanger carrier is suspended laterally on a running rail of the conveying apparatus by way of one of two running rollers which project from the carrier body symmetrically to the vertical center plane of said hanger carrier, the running roller being guided on a running surface of the rail for movement in the longitudinal direction of the rail. Beneath the running rollers, symmetrically to the vertical longitudinal center plane, two rigid protrusions project laterally from the carrier body, the outwardly oriented surfaces of said protrusions being designed as frictional surfaces for a frictional-belt drive. During conveying operation, the frictional surface which is directed toward the running rail in each case is in drive connection with a frictional belt which runs in a guide of the running rail, in the longitudinal direction of the rail. The frictional belt, which is moved along the rail, carries along the conveyable-article carrier via the frictionally locking coupling between the frictional surface and frictional belt, and the running roller of the conveyable-article carrier, said roller being guided on the rail, rolls on the running surface of the running rail.

The known suspended conveying apparatus is a power-and-free conveyor which is capable of accumulation and in the case of which a group of similar conveyable-article carriers can be accumulated in a build-up region as the frictional belt continues running. In order to avoid the situation where the frictional surfaces of the accumulated conveyable-article carriers rub against the frictional belt as it continues running, the known conveyable-article carrier has a separating device for temporarily releasing the drive connection. Said separating device comprises, on both sides of the vertical center plane, in each case one resilient tongue which can be spread laterally from the carrier body and is provided at a relatively large vertical distance from the running rollers beneath the frictional-surface protrusions. In the spread state, the resilient tongue is supported on an abutment surface of the running rail, the conveyable-article carrier being pivoted by a small amount relative to the running rail such that the frictional surface is freed from the frictional belt or at least butts against the frictional belt with reduced abutment pressure. The resilient tongue is spread under the action of the build-up pressure, an adjacent conveyable-article carrier in the build-up in each case forcing the resilient tongue outward into the spreading position by way of a spreading mandrel. A disadvantage of this known conveyable-article carrier is that comparatively high forces are necessary in order to pivot the hanger carrier as a whole such that, in the build-up arrangement, it is reliably freed from the frictional belt. In particular by virtue of the conveyable articles which are to be transported having a relatively high dead weight, the forces which are necessary for disconnecting the hanger carrier are of such a magnitude that they can only be applied with a considerable build-up pressure of a relatively large number of advancing hanger carriers. The forces for disconnecting, i.e. for pivoting the hanger carriers relative to the running rail cannot be defined particularly well on account of the dependence on the dead weight of the conveyable-article carrier, with the result that the disengagement from the frictional belt, which is required during build-up, does not always take place reliably and often only takes place with delay, that is to say once a sufficiently high build-up pressure has been produced. With delayed or incomplete disengagement of the conveyable-article carrier from the frictional belt, there is a risk of increased wear to the frictional surface and of pronounced heating by frictional heat both on the hanger carrier and on the frictional belt. Furthermore, the rubbing of the frictional surfaces subjects the frictional belt to more pronounced loading, with the result that the frictional-belt drive has to be dimensioned such that it can overcome such loading. Added to this is the fact that the frictionally locking coupling of the conveyable-article carrier to the drive belt during conveying operation depends to a great extent on the dead weight of the conveyable-article carrier.

The object of the present invention is to provide a conveyable-article carrier of the type mentioned in the introduction of which the separating device functions reliably for temporarily releasing the drive connection irrespective of the loading to which said carrier is subjected by the dead weight of the conveyable articles.

In order to achieve this object, the invention proposes that, in the case of the conveyable-article carrier, the coupling element be designed as a part of the separating device which can be moved relative to the carrier body between a drive position, for coupling to the drive belt, and a neutral position, for disengaging from the drive belt.

In contrast to the conveyable-article carrier according to the prior art, it is not necessary for the conveyable-article carrier according to the present invention to be moved as a whole transversely to the running rail for disengagement from the drive belt; rather, it is essentially only the coupling element which needs to be moved for this purpose. The movement of the coupling element between the drive position and the neutral position may be brought about by comparatively low, and in particular, defined forces, with the result that, in the case of a build-up, a low build-up pressure is sufficient in order to disengage the conveyable-article carrier reliably from the drive belt. This means that operation of the conveying apparatus fitted with the conveyable-article carriers involves less destruction.

The coupling element is expediently prestressed resiliently in the direction of the drive position, with the result that it can be moved into the neutral position counter to the spring prestressing. The prestressing may be applied, for example, by means of a straightforward helical spring. Appropriate selection of the spring allows the force which is necessary for disconnecting the conveyable-article carrier to be very well defined.

The separating device preferably has an actuating element for the coupling element, it being possible, in the case of a conveying build-up, for the actuating element to be actuated under build-up pressure by an adjacent conveyable-article carrier in the build-up in order to move the coupling element into the neutral position. In conjunction with this, it is proposed that the separating device has a disconnecting element which, in the case of a conveying build-up, can pass into engagement with the actuating element of a similar, directly adjacent conveyable-article carrier in the build-up in order to move the coupling element thereof into the neutral position. The conveyable-article carrier is thus of such a nature that, in the build-up arrangement, it is disconnected automatically from an adjacent conveyable-article carrier.

Although the invention can be used for conveyable-article carriers for chain conveyors with a chain as the drive belt, the preferred embodiment of the invention relates to a conveyable-article carrier for a conveying apparatus in which the drive belt is a frictional belt, the coupling element of the conveyable-article carrier having a frictional surface which is to be connected to the frictional belt with frictional locking in order to produce the drive connection. The advantages of the invention are evident, in particular, in conjunction with such a frictional-belt drive. The reliable and rapid disengagement of the conveyable-article carrier from the frictional belt in the case of a build-up ensures that the frictional surface is not adversely affected and that excessive heating of the conveyable-article carrier and of the frictional belt is avoided. Since accumulated conveyable-article carriers according to the invention do not rub against the frictional belt as it continues running, the frictional belt may be driven by a relatively small-dimensioned and inexpensive drive motor.

A preferred embodiment of the invention provides on the conveyable-article carrier at least one laterally projecting running roller for the suspended support and guidance of the conveyable-article carrier on a running-profile surface of the running rails of the conveying apparatus, it being the case that the frictional surface of the conveyable-article carrier, which is suspended on the running-profile surface by way of its running roller, is located opposite the frictional belt and, with the coupling element located in the drive position, is displaced laterally outward relative to the carrier body, with the result that it is in frictionally locking connection with the frictional belt. As the coupling element passes from the drive position into the neutral position, the frictional surface moves in the direction of the carrier body in order to be freed from the frictional belt.

In the case of a separating device which can be realized relatively straightforwardly, the coupling element can be pivoted relative to the carrier body between the drive position and the neutral position about an essentially vertical pivot axis, the coupling element preferably being provided on one lever arm of a two-armed lever which can be pivoted about the pivot axis and of which the other lever arm is designed as the actuating element for the coupling element. Such a lever design constitutes an uncomplicated and reliably functioning coupling-element actuating mechanism which can be activated by an adjacent conveyable-article carrier in the build-up.

In the driven state, the conveyable-article carrier is intended to be carried along by the frictional belt with as little slippage as possible. In order to ensure this, it is proposed that the coupling element be provided with a rubber coating which has the frictional surface.

According to a particularly preferred embodiment of the invention, there is rotatably mounted on the carrier body at least one lateral supporting roller by means of which the conveyable-article carrier can be supported laterally on a vertical side surface of a respective running rail of the conveying apparatus.

The supporting roller ensures that the conveyable-article carrier is in defined alignment with the running rail irrespective of the loading to which it is subjected by the dead weight of the conveyable articles which are to be transported. This ensures that, during the movement between the drive position and the neutral position, the coupling element always has to cover the same path, and that the contact-pressure force, which is applied by a spring and is exerted on the frictional belt by the frictional surface, and the force which is necessary for disconnecting the hanger carrier are very well defined.

In a modified embodiment, the spacer function of the lateral supporting roller may be performed by a protrusion which projects laterally from the carrier body and slides on a relevant abutment surface of the running rail.

An exemplary embodiment of the invention is explained in more detail hereinbelow with reference to the drawings, in which:

FIG. 3a shows a sectional illustration of the conveyable-article carrier along the section plane indicated at III—III in FIG. 1, it being possible to see details of the separating device with the coupling element located in the drive position;

Figure 1:
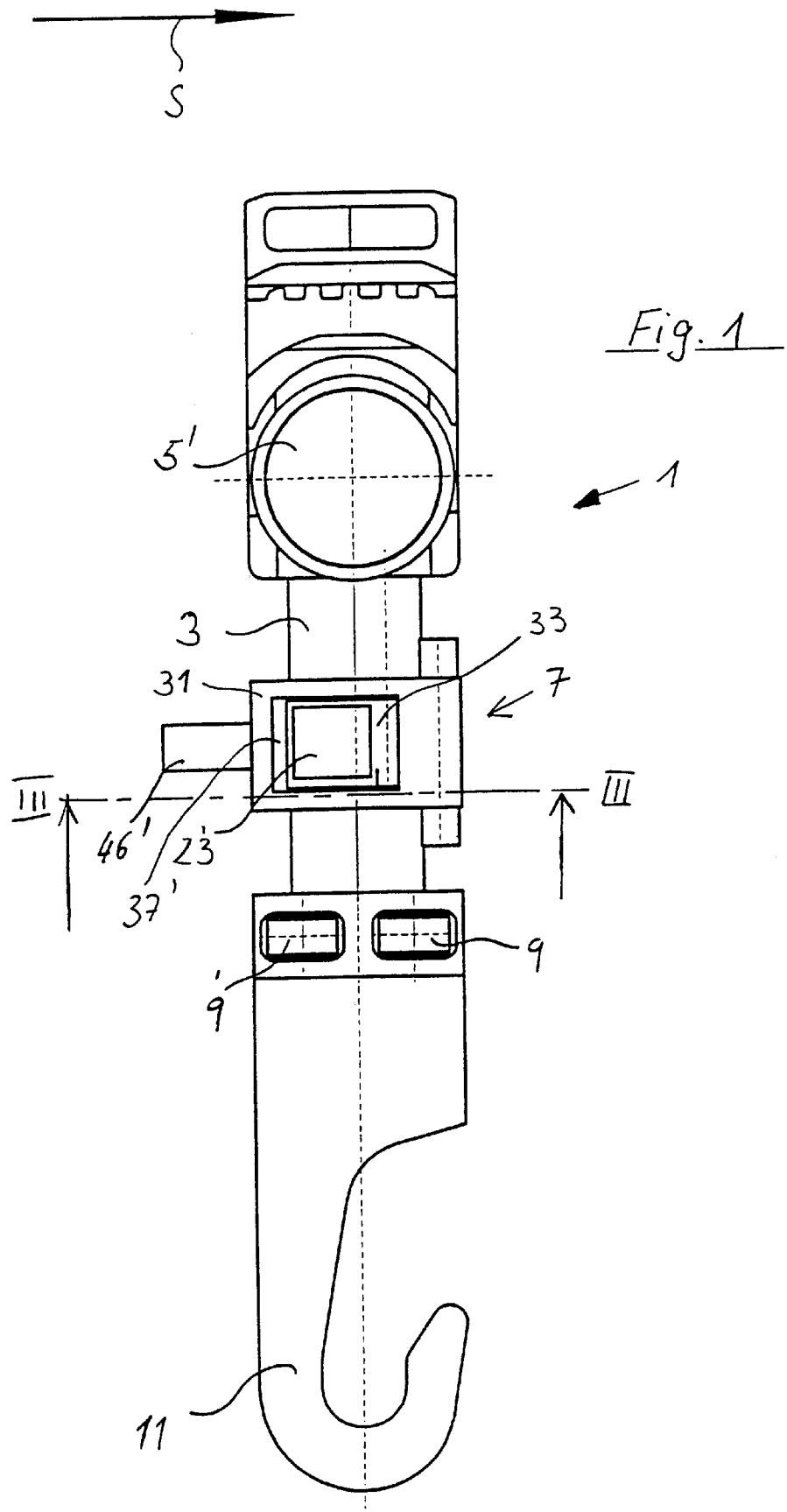
FIG. 1 shows a side view of a conveyable-article carrier according to the invention, the drive direction being indicated by an arrow S.
Figure 4:
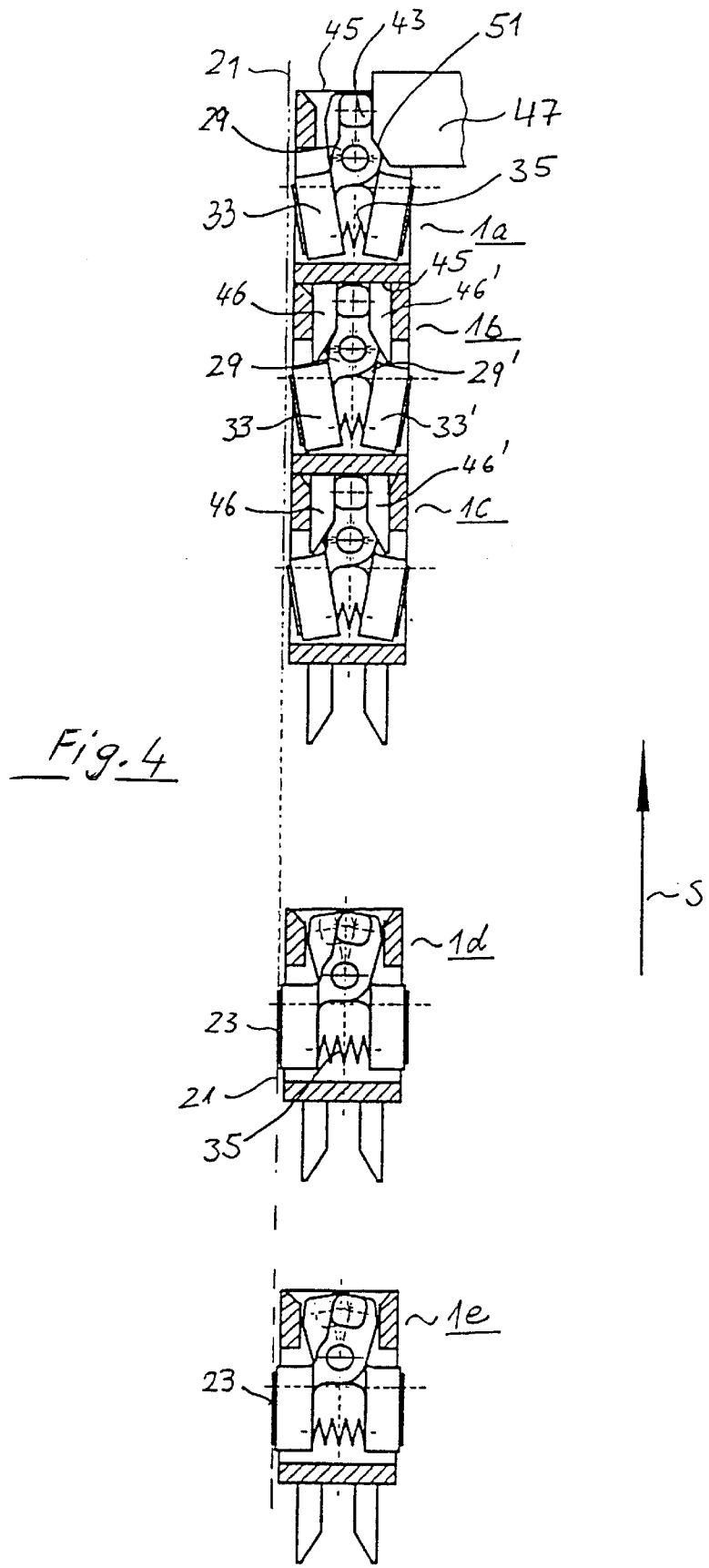

FIG. 3b shows a sectional view corresponding to FIG. 3a, the relevant coupling element being shown in the neutral position, FIG. 4 shows a group of conveyable-article carriers of the type illustrated in FIG. 1 in a sectional view such as that in FIGS. 3a and 3b, a conveying build-up having been produced, and FIG. 5 shows a diagram for explaining force relationships between a coupling element and a drive belt.

The conveyable-article carrier shown in the figures is a so-called hanger carrier 1 as can be used, for example, in the clothing industry or in large-scale laundries for transporting items of clothing hanging on clothes hangers in a suspended conveying apparatus. The hanger carrier 1 is constructed essentially symmetrically to the vertical center plane X—X indicated in FIG. 2 and has a carrier body 3, two running rollers 5, 5', which project laterally from said carrier body and are connected to one another via a common shaft, a separating device 7, in each case one pair of lateral supporting rollers 9, 9' and a bottom hook 11 from which to hang clothes hangers or the like.

Figure 2:
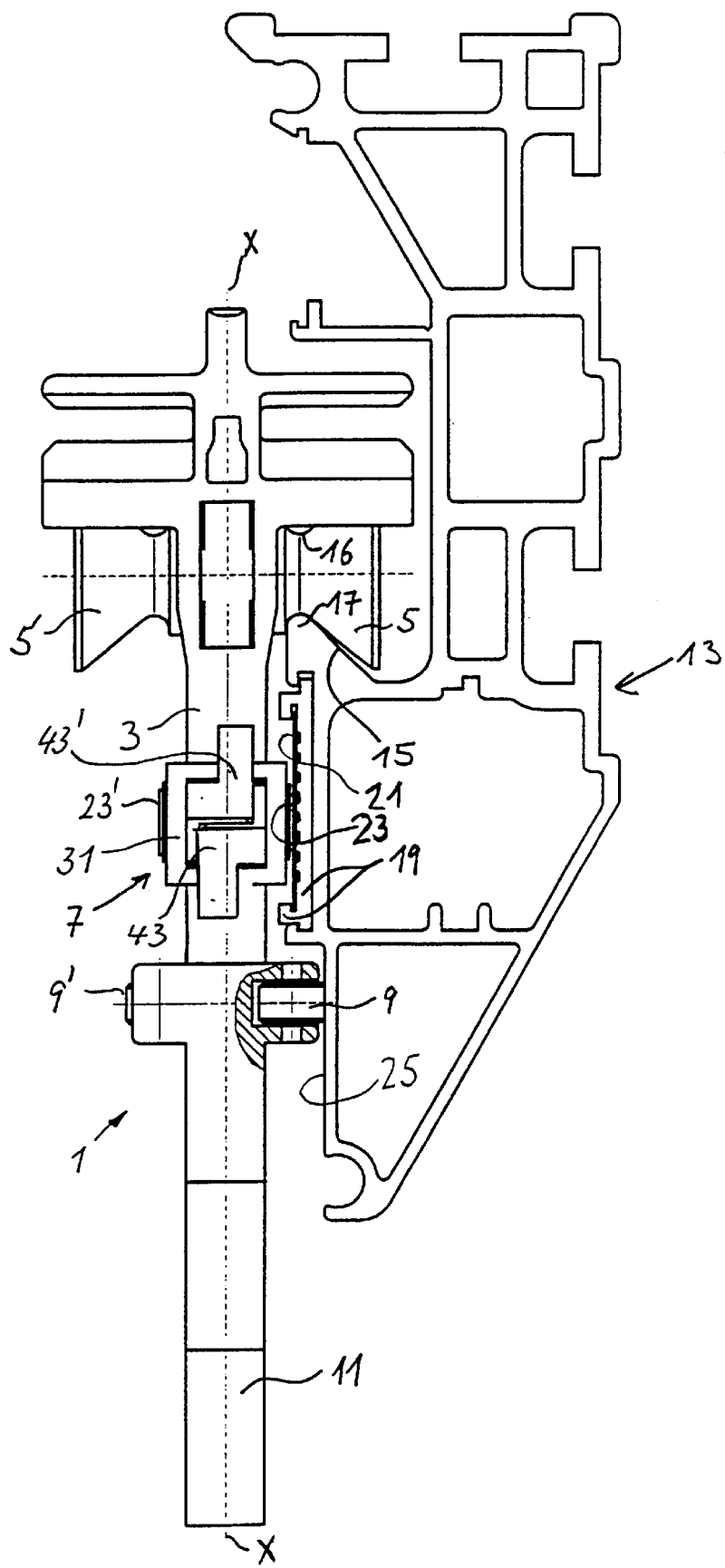
FIG. 2 shows a front view of the conveyable-article carrier according to FIG. 1, the conveyable-article carrier being illustrated as hanging on a running-rail profile of a suspended conveying apparatus.

In the case of the arrangement of the hanger carrier 1 in a suspended conveying apparatus shown in FIG. 2, the hanger carrier 1 is supported on a running surface 15 of the running rail 13 by way of one of its conical running rollers 5, 5' in each case, the running surface 15 having a slope adapted more or less to the contour of the running roller 5. The hanger carrier 1 suspended laterally on the running rail 13 in this way is thus guided on the running-surface profile of the running rail 13 for movement in the longitudinal direction of the rail (in the illustration according to FIG. 2 in the direction perpendicular to the plane of the sheet).

Provided beneath the point 17 of the running-surface profile, said point engaging in the groove 16 of the running roller 5, is a guide 19 in which a frictional belt 21, for driving hanger carriers 1, runs along the rail 13. The frictional belt 21 is usually an endless belt which is guided around deflecting drums at relevant deflecting stations. For driving the hanger carrier 1, the frictional belt 21 is in frictionally locking connection with a frictional surface 23 of the hanger carrier 1 on its outwardly oriented large-face side, with the result that, as the frictional belt 21 moves along the running rail 13, the hanger carrier 1 is carried along by the frictional belt 21.

According to FIG. 2, the hanger carrier 1 is supported laterally on a vertical abutment surface 25 of the running rail 13 by way of lateral supporting rollers 9 beneath the frictional-belt drive 21, 23. As can be seen in that region of the hanger carrier 1 which is illustrated in a broken-away state, the lateral supporting rollers 9 are mounted such that they can be rotated about a vertical axis of rotation, with the result that, during movement of the hanger carrier 1, they can roll on the abutment surface 25 in the longitudinal direction of the rail.

Following rotation through 180°, the hanger carrier 1 can be suspended on the running rail 13 by way of its running roller 5', which is located to the left of the center plane X—X in FIG. 2, the symmetrical construction resulting in the lateral supporting-roller pair 9' coming into contact with the abutment surface 25 and the frictional surface 23' coming into contact with the frictional belt 21.

FIG. 3a shows details of the separating device 7, which serves for eliminating the drive connection between the frictional belt 21 and the relevant frictional surface 23 or 23' in the case of a build-up of conveyable-article carriers 1 on the running rail 13. The separating device 7 has two two-sided levers 29, 29' which are mounted in a scissors-like manner on a common pivot pin 27, such that they can be pivoted about a vertical axis, and are arranged in a frame 31 secured on the carrier body 3. Each of the two levers 29, 29' has a coupling element 33 or 33', respectively, on one lever arm, the coupling elements 33, 33' being located opposite to one another essentially symmetrically to the center plane X—X and being connected to one another by a compression spring 35 on their sides which are directed toward one another in the frame 31. The prestressing of the compression spring 35 means that the coupling elements 33, 33' are normally located in the position shown in FIG. 3a, in which their surfaces 23, 23', which are directed away from one another, project beyond the side surfaces 39, 39' of the frame 31 through a respective window 37, 37' of the frame 31. Said surfaces 23, 23' are the frictional surfaces 23, 23' of the hanger carrier 1, of which in each case one—in FIG. 3a the frictional surface 23—is in frictional contact with the frictional belt of the running rail, said belt being indicated at 21 in FIG. 3a, when the hanger carrier 1 hangs on the running rail 13 in the manner shown in FIG. 2.

On their outer sides, directed away from one another, the coupling elements 33, 33' are provided with rubber coatings 41 which have the frictional surfaces 23, 23'.

Such rubber elements 41 or similar elastic elements have proven particularly advantageous since, even with a comparatively low contact pressure (pressure of the spring 35), they allow reliable drive coupling to the frictional belt 21.

The coupling elements 33, 33' can be pivoted counter to the restoring force of the spring 35 from their pivot position according to FIG. 3a, referred to here as the drive position, into the neutral position according to FIG. 3b, in which case they are moved toward one another and further into the frame 31. In this case, the relevant frictional surface 23 is freed from the frictional belt 21, this releasing the drive connection between the hanger carrier 1 and the frictional belt 21 as the frictional belt 21 continues running.

The pivoting of the coupling elements 33, 33' into the neutral position according to FIG. 3b takes place by means of the lever arms 43, 43', which, in the manner which can be seen in FIG. 2, are arranged one above the other on the common pivot pin 27, which is fixed on the carrier body 3. The free ends of the lever arms 43, 43' are accessible from the outside, from the window 45 of the frame 31, in order for the levers 29, 29' to be pivoted into the position according to FIG. 3b.

On the side located opposite the window 45, the hanger carrier 1 has two outwardly projecting disconnecting elements 46, 46' which, in the case of a build-up of similar hanger carriers 1, penetrate under the action of the build-up pressure into the corresponding window 45 of the adjacent hanger carrier in the build-up and pivot the lever arms 43, 43' thereof into the position according to FIG. 3b in order to release the drive connection with the frictional belt 21.

The wall regions 40, which bound the window 45 laterally, have sloping introduction surfaces 42 for relevant disconnecting elements 46, 46' of an adjacent hanger carrier 1 in the build-up. The introduction surfaces 42 ensure that the disconnecting elements 46, 46' of the relevant hanger carrier 1 can penetrate into the window 45 in a guided manner, the disconnecting elements 46, 46' engaging the lever arms 43, 43' between them. The sloping surfaces 44 at the free end of the disconnecting elements ensure that the engaged lever arms 43, 43' are steadily forced into their position corresponding to the neutral position.

FIG. 4 illustrates the situation where a build-up of 5 hanger carriers 1a–1e is produced in a build-up region of the conveying apparatus.

The conveying apparatus has a disconnecting cam which is indicated at 47 in FIG. 4 and can be moved optionally into the conveying path of the hanger carrier 1 in order to form a build-up. If a first hanger carrier then approaches, with its window 45 aligned to the front in the conveying direction, the disconnecting cam 47 located in the barrier position, then the disconnecting cam 47 comes into engagement with the lever of the coupling element 33 on the lever arm 43, said coupling element being in contact with the frictional belt 21, it being the case that a pin projecting vertically from the lever arm 43 (cf. FIG. 2) follows the sloping-surface path 51 of the disconnecting cam 47 which can be seen in FIG. 4, with the result that the lever 29 forces the coupling element 33 into the neutral position. FIG. 4 illustrates the hanger carrier 1a, which is stopped by the disconnecting cam 47, in the state in which the coupling element 33 has been disconnected by the disconnecting cam 47. According to FIG. 4, the hanger carrier 1b has moved onto the hanger carrier 1a, it being the case that the disconnecting elements 46, 46' of the hanger carrier 1a have penetrated into the window 45 of the hanger carrier 1b and have thus pivoted the levers 29, 29' and the coupling elements 33, 33', arranged thereon, of the hanger carrier 1b into the neutral position. Correspondingly, the hanger carrier 1c has also already been disconnected by the disconnecting elements 46, 46' of the hanger carrier 1b, with the result that the already accumulated hanger carriers 1a–1c have been disengaged from the drive belt 21.

The hanger carriers 1d and 1e are in drive connection with the drive belt 21 via their frictional surfaces 23, with the result that they are moved in the direction of the build-up and, finally, upon reaching the build-up, are disconnected by the disconnecting elements 46, 46' of the adjacent hanger carrier in the build-up.

If the disconnecting cam 47 is then removed from its barrier position according to FIG. 4, the coupling elements 33, 33' of the hanger carrier 1a come out of their neutral position on account of the prestressing of the compression spring 35, with the result that the coupling element 33 comes into drive connection with the drive belt 21. The hanger carrier 1a is thus moved on, its disconnecting elements 46, 46' being freed from the hanger carrier 1b, with the result that the coupling element 33 of the latter hanger carrier also comes into drive connection again with the drive belt 21. In this way, the build-up is broken up gradually.

As can be seen from FIG. 2, the hanger carrier 1 is suspended on the running rail 13 such that it butts against the abutment surface 25 by way of its lateral supporting rollers 9, it being possible for the lateral supporting rollers 9 to roll on the abutment surface 25. The fact that the hanger carrier 1 is supported on the abutment surface 25, on the one hand, and the running-surface profile 15, on the other hand, achieves the situation where the carrier body 3 has a well-defined position relative to the running rail 13 with a low tendency to oscillate. This well-defined position of the hanger carrier 1 relative to the running rail 13 is essentially independent of whether the relevant coupling element 33 is in the drive position or in the neutral position. This also means that the contact-pressure force of the frictional surface 23 (or, if appropriate, the frictional surface 23') against the frictional belt 21 can be very well defined in particular by appropriate selection of the spreading spring 35. It is thus easily possible to realize the same drive conditions for a multiplicity of hanger carriers according to the invention in a conveying apparatus, to be precise irrespective of the dead weight in each case of the individual hanger carriers on the hooks 11. The better defined drive conditions, which are more or less the same for all the driven hanger carriers, ensure that operation of a relevant conveying apparatus involves less disruption than hitherto.

An interesting point relating to the force relationships between the frictional belt 21 and the coupling element 33 of a conveyable-article carrier 1 coupled to the frictional belt 21 in the drive position is indicated schematically in FIG. 5. The frictional belt, which is moved in the direction of the arrow S, and the coupling element, which is indicated at 33, are in frictionally locking connection with one another, the frictional force $F_R$ ensuring that the relevant conveyable-article carrier is carried along by the frictional belt 21. Coupling of the coupling element 33 to the frictional belt 21 results, on account of the force $F_R$, in a moment in relation to the pivot axis P of the coupling element 33, said moment, which is indicated at M, increasing the contact pressure of the coupling element 33 against the frictional belt 21. This moment effect thus results in excellent coupling being produced between the coupling element 33 and the frictional belt 21 and in the relevant hanger carrier being driven reliably, and with low slippage, by the frictional belt 21.

In the build-up region, the hanger carriers 1 reliably disconnect one another, with the result that the frictional surfaces 23 of the stopped hanger carriers 1 do not then rub against the frictional belt 21. This means that barely any frictional heat is produced on the frictional belt 21, which usually consists of steel, and on the accumulated hanger carriers 1 and wear to the frictional surfaces 23 is avoided.

What is claimed is:

1. A conveyable-article carrier for a suspended conveying apparatus having running rails and a frictional drive belt, the conveyable-article carrier comprising:

a carrier body;

a two-armed lever mounted pivotably on the carrier body;

a coupling element provided on a first lever arm of the two-armed lever, for bringing into drive connection the frictional belt; and a separating device actuable by a second lever arm of the two-arm lever, wherein the two-arm lever is movable between a drive position, for coupling to the frictional belt, and a neutral position, for disengaging from the frictional belt, the separating device being actuated under a build-up wherein, pressure by adjacent conveyable-article carriers in a build-up region of the conveying apparatus operate the two-armed lever to release the drive connection.

2. The conveyable-article carrier as claimed in claim 1, wherein the coupling element is prestressed resiliently in the direction of the drive position.

3. The conveyable-article carrier as claimed in claim 1, wherein the separating device has a disconnecting element which, in a build-up, can pass into engagement with an actuating element of a similar, directly adjacent conveyable-article carrier to move the coupling element into the neutral position.

4. The conveyable-article carrier as claimed in claim 1, wherein the carrier body has at least one laterally projecting running roller for suspended support and guidance of the conveyable-article carrier on a running-profile surface of the running rails, wherein a frictional surface of the conveyable-article carrier is suspended on the running-profile surface opposite the frictional belt, and wherein, when the coupling element is located in the drive position, the frictional surface is displaced laterally outward relative to the carrier body to frictionally lock with the frictional belt.

5. The conveyable-article carrier as claimed in claim 1, further comprising:

at least one lateral supporting roller rotatably mounted on the carrier body, wherein the conveyable-article carrier is supported laterally on a vertical side surface of a respective running rail of the conveying apparatus.

6. The conveyable-article carrier as claimed in claim 1, wherein the coupling element is provided with a rubber coating to bring into drive connection the conveyable-article carrier with the frictional belt.

* * * * *